UNITED STATES PATENT OFFICE.

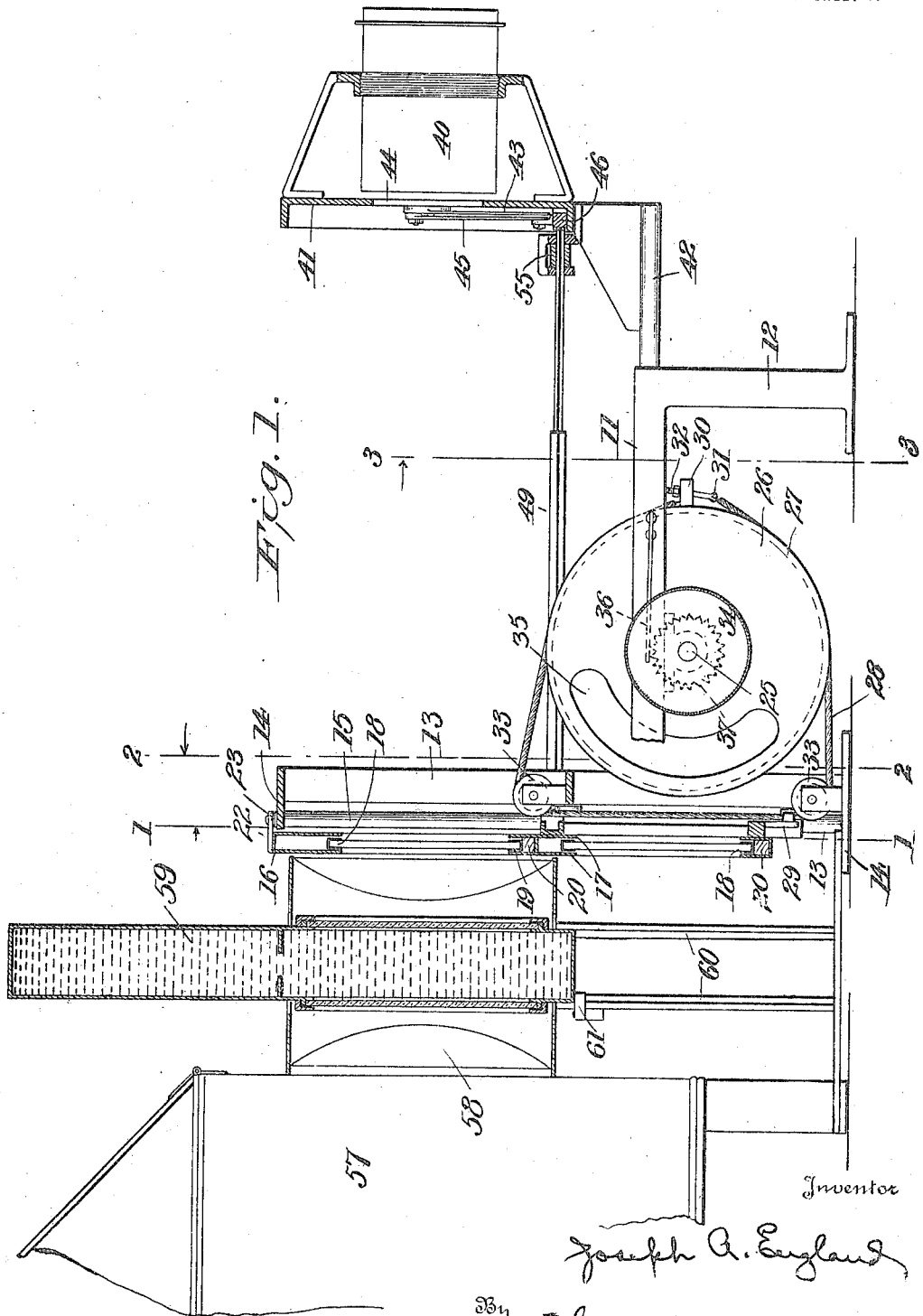

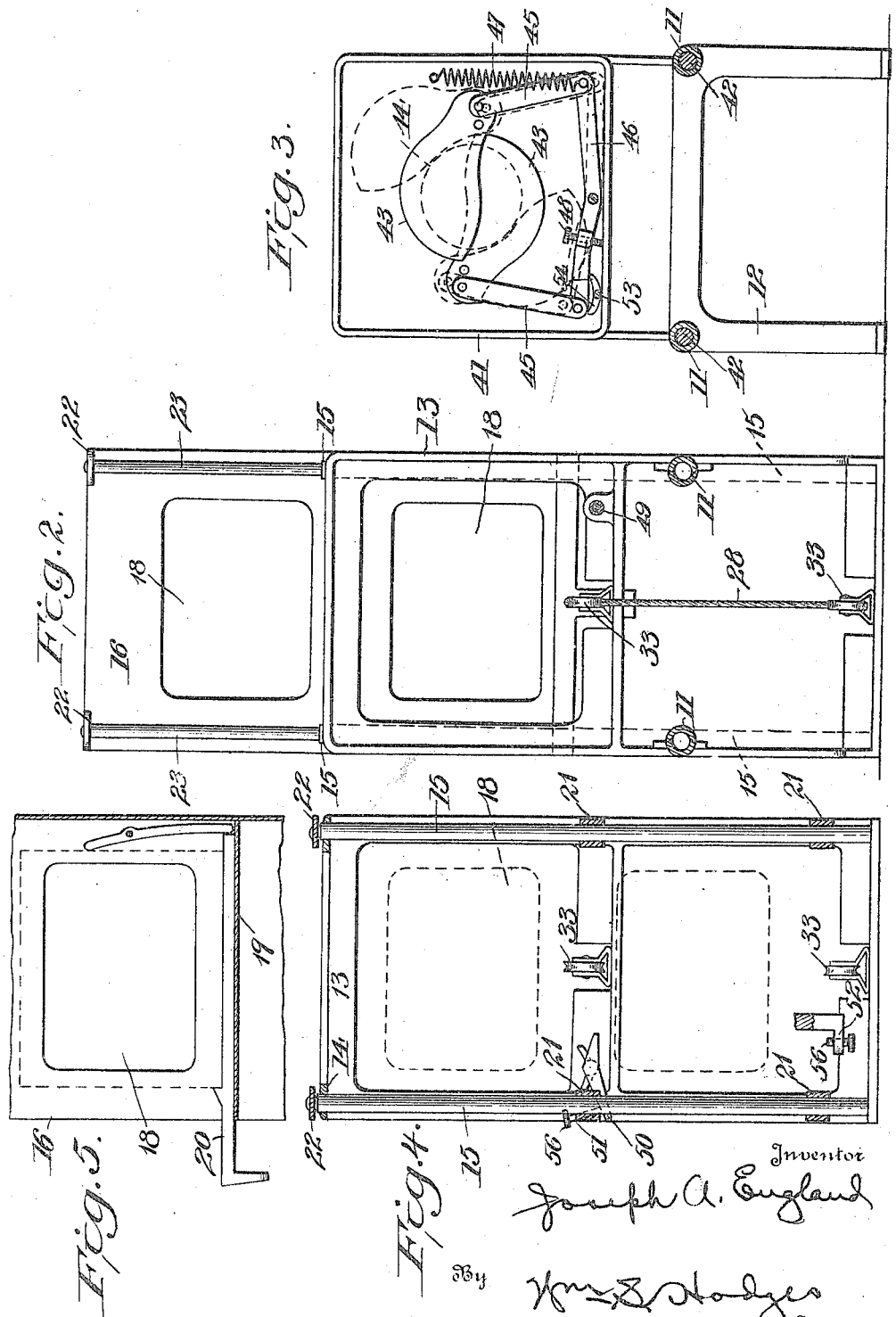

JOSEPH A. ENGLAND, OF WASHINGTON, DISTRICT OF COLUMBIA.

PROJECTING APPARATUS.

1,257,986.        Specification of Letters Patent.      Patented Mar. 5, 1918.

Application filed August 21, 1916. Serial No. 116,106.

*To all whom it may concern:*

Be it known that I, JOSEPH A. ENGLAND, a citizen of the United States, residing at Washington, in the District of Columbia, have invented new and useful Improvements in Projecting Apparatus, of which the following is a specification.

This invention is an improved device for supporting and exhibiting lantern slides.

One of the objects of the invention is to provide an improved slide carrying means whereby one slide may be retained in projecting position while another slide is being changed, thereby greatly facilitating the projecting operations. A further object is to provide a reciprocable slide carrier and means for maintaining it at either extreme of its reciprocatory movement. A further object is to provide means whereby the shutter may be automatically controlled by movements of the slide carrier. A further object is to provide an improved shutter mechanism and slide carrier so correlated that the shutter will be closed while the slide carrier is moving, and promptly opened at the end of the movement of said slide carrier.

The invention will be hereinafter fully set forth and particularly pointed out in the claims.

In the accompanying drawings:—

Figure 1 is a longitudinal sectional view illustrating the projecting apparatus, lamp, casing, etc. Fig. 2 is a transverse sectional view on the line 2—2, Fig. 1, looking toward the slide carrier, showing the slide carrier in raised position. Fig. 3 is a transverse section on the line 3—3, Fig. 1. Fig. 4 is a transverse section on the line 1—1, Fig. 1. Fig. 5 is a detail view illustrating the slide support.

Referring to the drawings, a supporting frame is provided with tubular side bars 11, supported at the forward end by a standard 12 and at its rear end by a rectangular frame 13, preferably constructed of angle iron, although the invention is not limited in this particular. The frame 13 is provided with top and bottom rearwardly extended flanges 14, to which the ends of vertically disposed tubular guides 15 are secured, said guides being located opposite the vertical side bars of the frame 13. The slide carrier 16 is constructed of suitable material, preferably sheet metal, being provided with spaced apart walls 17, connected in suitable manner at their edges and having openings 18 for framing the slides to be projected by the apparatus. Below each opening 18 is a guide 19 for a slide support 20, slidably connected to said guide, suitable means being provided to limit the movement of each slide support. Suitably attached to the slide carrier 16 is a guide frame comprising vertical portions having guide members 21 slidably engaging the guides 15, said guide members being connected by, and stiffened by transverse bars, to which the slide carrier is secured. The upper end of the slide carrier is provided with overhanging ears 22, to which are attached guide rods 23 extending downwardly into the tubular guides 15. From the foregoing it will be seen that the slide carrier is mounted for vertical reciprocation, being guided by guide members 21 and the guide rods 23, so as to move smoothly without lost motion.

The slide carrier may be reciprocated in any suitable manner. In the drawings is shown an actuator shaft 25, rotatably supported in suitable bearings carried by the side bars 11, and attached to said shaft is an actuator drum 26 provided with a peripheral groove 27 to receive a chain or other flexible member 28, attached to a depending lug 29 on the slide carrier. One end of the chain is secured to a pin 30 extending radially from the periphery of the drum 26, and the other end of the chain is attached to an adjusting device 31 having a threaded end extending through an opening in the pin 30, said threaded end being engaged by a nut 32. The chain 28 passes around guide pulleys 33 secured to the frame in suitable manner. The actuator shaft is provided with a milled hand grip 34, by which said shaft may be conveniently rotated. By rotating the shaft in one direction the slide carrier is elevated, and by reversing the direction of rotation of said shaft, the slide carrier is lowered. The slide carrier may be counterbalanced in any preferred manner. For instance, the drum 26 may be cut away as indicated at 35 so as to position the heavier portions of the drum to hold the slide in either of its positions. In order to prevent lost motion, a suitable catch pawl 36, coöperating with a ratchet wheel 37 may be provided, the same serving as a brake to hold drum 36 stationary.

The lens casing 40, is supported in a suitable frame 41 carried by slide bars 42, telescoping with the side bars 11, the telescoping arrangement permitting of adjustment of the lens casing, with respect to the slide carrier. Pivotally attached to the lens casing of frame 41, are two shutter segments 43, so positioned that they may overlap to close the opening 44 registering with the lens. Each shutter segment is connected, by means of links 45, with the ends of the lever 46, pivoted to the frame 41, a spring 47 engaging one end of said lever to hold the same in position to retain the segments 43 in normally closed position. Movement of the lever 46 may be adjustably limited by means of an abutment screw 48.

In order to operate the shutter segments 43 automatically in time with the reciprocation of the slide carrier 16, a rock shaft 49 is provided having its rear end extended through the frame 13, and provided with an actuator member 50, positioned to be engaged by tappet members 51 and 52, attached to the slide carrier. Telescoping with the rack shaft 49 is a shaft 53 provided with an angular end 54, positioned to engage one arm of lever 46, said shaft 53 being supported in a suitable bearing 55. In order to check up any lost motion between the slide carrier and the shutter segments, or to make provision for adjustment should the parts get out of register the tappet members 51 and 52 may be provided with adjustable abutment screws 56 to engage actuator 50.

The projecting apparatus above described may be employed with any preferred form of lamp casing, condenser, etc. In the drawing, the lamp casing is indicated at 57 and the condenser at 58. The water cell 59 is preferably mounted upon guides 60 so that the same may be moved into and out of operative position, being maintained in its uppermost position in line with the condenser, by means of a suitable gage 61. When the apparatus is not in use the gage 61 may be disconnected and the water cell lowered.

In operation, one or the other of the openings 18, is always in register with the opening 44 leading to the lens casing. By this arrangement the slide which is disposed opposite said opening is being projected while the operator is placing a new slide in the slide carrier opposite the other opening 18. Assuming that the slide carrier is in its lowermost position, and the upper slide is being projected, when it is desired to change the picture the shaft 25 is rotated forwardly, elevating the slide carrier through the medium of the chain 28. Just as soon as the tappet member 51 is disengaged from the actuator 50 the spring 47 acts on the lever 46 to close the shutter by bringing the shutter segments 43 back. The shutter will remain closed until the slide carrier reaches the uppermost limit of its movement. As the slide carrier approaches the limit of its movement the tappet member 52 engages the actuator 50 thereby rocking the shaft 49 and its telescoping member 53, bringing the angular end 54 into engagement with the lever 46, moving the latter against the tension of the spring 47, and thereby separating the shutter segments 43. The slide carrier will remain in the upper-most position, being counterbalanced by the drum 26, until the operator desires to exhibit the new slide which has been placed in the upper part of the slide carrier 16, whereupon the reverse rotation of the shaft 25, permits the shutter to again close, and remain closed until the tappet engages the actuator 50, again rocking the shaft 50 and its member 54.

Any suitable means may be provided to prevent relative rotation of shaft 53 and the rock shaft 49, but it is preferred to make these elements of angular cross section. Movement of the slide carrier in either direction is limited by stop screws or adjustable abutments carried by the slide and positioned to engage stationary portions of the frame.

Having thus explained the nature of my invention, and described an operative manner of constructing and using the same, although without attempting to set forth all of the forms in which it may be made, or all of the forms of its use, the following is claimed.

1. An improvement in projecting apparatus comprising a supporting frame provided with guides, a slide carrier slidably engaging said guides and having a plurality of slide supporting portions, the openings of which are all on the same side of the slide carrier, a transversely disposed actuator shaft positioned in front of the plane of movement of the slide carrier, and connections between said actuator shaft and said slide carrier.

2. An improvement in projecting apparatus comprising a supporting frame provided with vertically disposed guides, a slide carrier slidably engaging said guides and having superposed slide supporting portions, and means for counterbalancing the slide carrier.

3. An improvement in projecting apparatus comprising a supporting frame provided with vertically disposed guides, a slide carrier slidably engaging said guides and having superposed slide supporting portions, and a counterbalancing actuator member connected with said slide carrier.

4. An improvement in projecting apparatus comprising a supporting frame provided with vertically disposed guides, a slide carrier slidably engaging said guide, and having superposed sliding portions, a transversely disposed actuator shaft supported by said frame in front of the plane of movement of said slide carrier, and means operated by said shaft for reciprocating said slide carrier.

5. An improvement in projecting apparatus comprising a supporting frame provided with vertically disposed guides, a slide carrier slidably engaging said guides and having superposed slide supporting portions, an actuator shaft supported by said frame, means operated by said shaft for reciprocating said slide carrier, and means for counterbalancing said slide carrier.

6. An improvement in projecting apparatus comprising a supporting frame provided with vertically disposed guides, a slide carrier slidably engaging said guides and having superposed slide supporting portions, an actuator shaft supported by said frame, an actuator drum secured to said shaft, and flexible connections between said drum and said slide carrier.

7. An improvement in projecting apparatus comprising a supporting frame provided with vertically disposed guides, a slide carrier slidably engaging said guides and having superposed slide supporting portions, an actuator shaft supported by said frame, an actuator drum secured to said shaft, flexible connections between said drum and said slide carrier, and means for adjusting the tension on said flexible member.

8. An improvement in projecting apparatus comprising a supporting frame provided with vertically disposed guides, a slide carrier slidably engaging said guides and having superposed slide supporting portions, an actuator shaft supported by said frame, an actuator drum secured to said shaft, and flexible connections between said drum and said slide carrier, said drum having cut out portions to permit the drum to counterbalance said slide carrier.

9. An improvement in projecting apparatus comprising a supporting frame having tubular guides, a slide carrier having a guide frame slidably engaging said tubular guides, guide rods attached to said slide carrier and telescoping with said guides, and means for reciprocating said slide carrier.

10. An improvement in projecting apparatus comprising a supporting frame having tubular guides, a slide carrier having a guide frame slidably engaging said tubular guides, guide rods attached to said slide carrier and telescoping with said guides, means for reciprocating said slide carrier, and means for counterbalancing said slide carrier.

11. An improvement in projecting apparatus comprising a supporting frame having upstanding guide arms, a slide carrier having superposed slide supporting portions, a guide frame attached to said slide carrier and engaging said guides, means for reciprocating said slide carrier, and means for counterbalancing said slide carrier.

12. An improvement in projecting apparatus comprising a supporting frame having a vertically disposed rectangular portion at one end, vertical guides supported by said rectangular portion, a slide carrier engaging said guides and having superposed slide supporting portions, means for reciprocating said slide carrier, and means for counterbalancing the slide carrier.

13. An improved projecting apparatus comprising a frame, a reciprocatory slide carrier supported thereby, a lens supporting frame having an opening therein, a shutter mechanism attached to said lens frame, and means actuated by the slide carrier at each limit of its reciprocable movement for operating the shutter mechanism.

14. An improved projecting apparatus comprising a frame, a reciprocatory slide carrier supported thereby, a lens-supporting frame having an opening therein, shutter segments pivoted to said lens-supporting frame, means for normally holding said shutter segments in closed position, and means actuated by the slide carrier for maintaining the shutter segments in open position.

15. An improved projecting apparatus comprising a frame, a reciprocatory slide carrier supported thereby, a lens-supporting frame having an opening therein, shutter segments pivoted to said lens-supporting frame, a lever for actuating said segments, means acting normally to close said segments, and means actuated by the slide carrier and engaging said lever to maintain the segments in open position.

16. An improved projecting apparatus comprising a frame, a reciprocatory slide carrier supported thereby, a lens-supporting frame having an opening therein, shutter members pivoted to the lens-supporting frame, means acting to normally close said shutter members, a rock shaft actuated by movement of the slide carrier, and means connected with said rock shaft for engaging said lever to maintain the shutter members in open position.

17. An improved projecting apparatus comprising a frame, a reciprocatory slide carrier supported thereby, a lens-supporting frame having an opening therein, shutter members pivoted to said lens-supporting frame, means normally acting to move the shutter members to closed position, a rock shaft provided with an actuator, means carried by the slide carrier for engaging said actuator, and means carried by the rock shaft for engaging said lever to maintain the shutter members in open position.

18. An improved projecting apparatus comprising a frame, a reciprocatory slide carrier supported thereby, a lens-supporting frame having an opening therein, shutter members pivoted to said lens-supporting frame, means normally acting to move the shutter members to closed position, a rock shaft provided with an actuator, adjustable abutments carried by the slide carrier and positioned to engage said actuator, and means carried by the rock shaft for engaging said lever to maintain the shutter members in open position.

19. A projecting apparatus comprising a supporting frame, a reciprocable slide carrier supported thereby, a lens supporting frame adjustably supported with respect to said slide carrier, a rock shaft formed of telescoping sections, shutter mechanism on said lens-supporting frame and operatively connected with said rock shaft, and means whereby said rock shaft is actuated by the slide carrier at each limit of the reciprocable movement of said slide carrier.

20. An improved projecting apparatus comprising a movable slide carrier, and shutter mechanism controlled by movement of said slide carrier, and means for automatically operating said shutter mechanism when said slide carrier reaches the limit of its movement.

21. An improved projecting apparatus comprising a movable slide carrier, a shutter operating lever, means controlled by movement of said slide carrier for automatically actuating said lever when said slide carrier reaches the limit of its movement.

In testimony whereof I have hereunto set my hand.

JOSEPH A. ENGLAND.

Copies of this patent may be obtained for five cents each, by addressing the "Commissioner of Patents, Washington, D. C."